Sept. 11, 1951 G. H. ZENNER ET AL 2,567,588
METHOD OF AND APPARATUS FOR WITHDRAWING
FLUID FROM CONTAINERS Filed Aug. 22, 1946 3 Sheets-Sheet 1

INVENTORS
GEORGE H. ZENNER
PETER M. RIEDE
BY
ATTORNEY

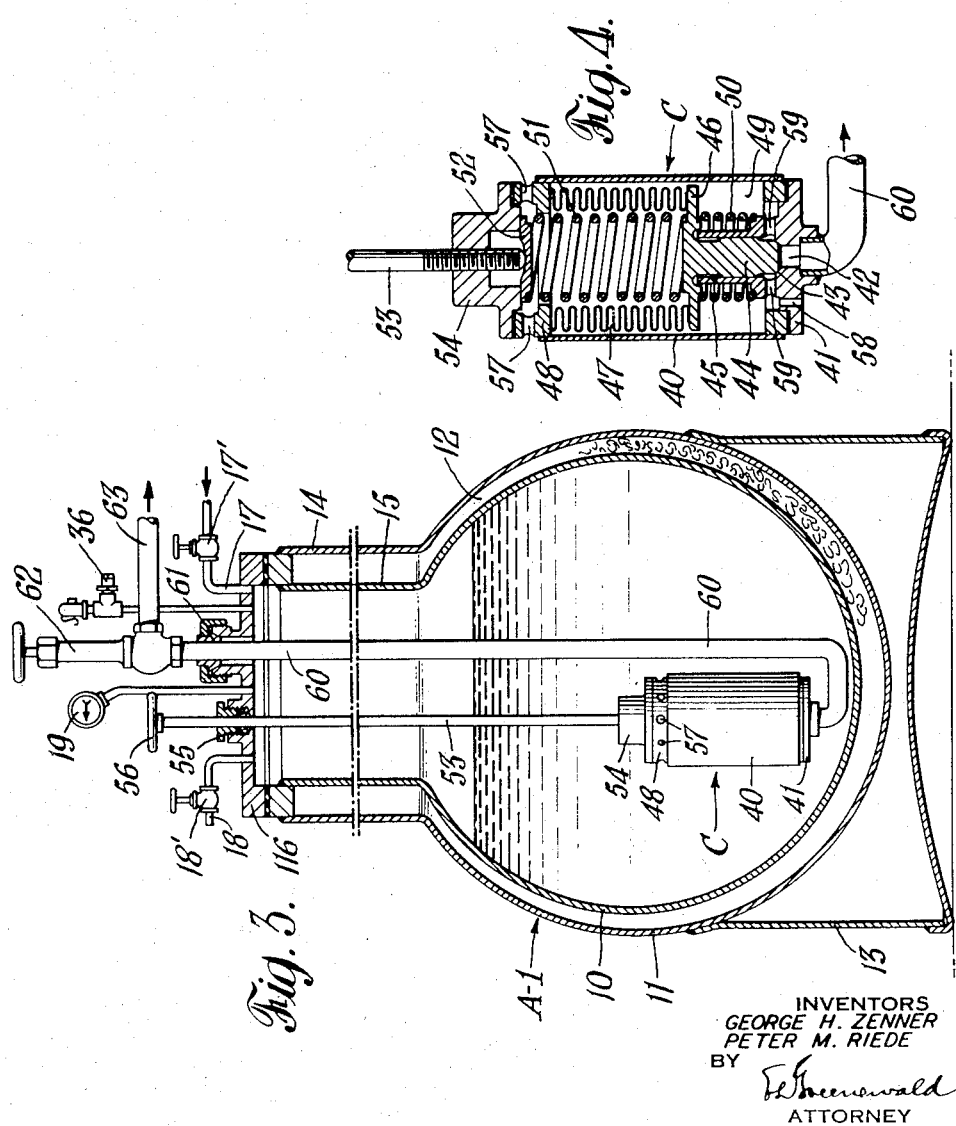

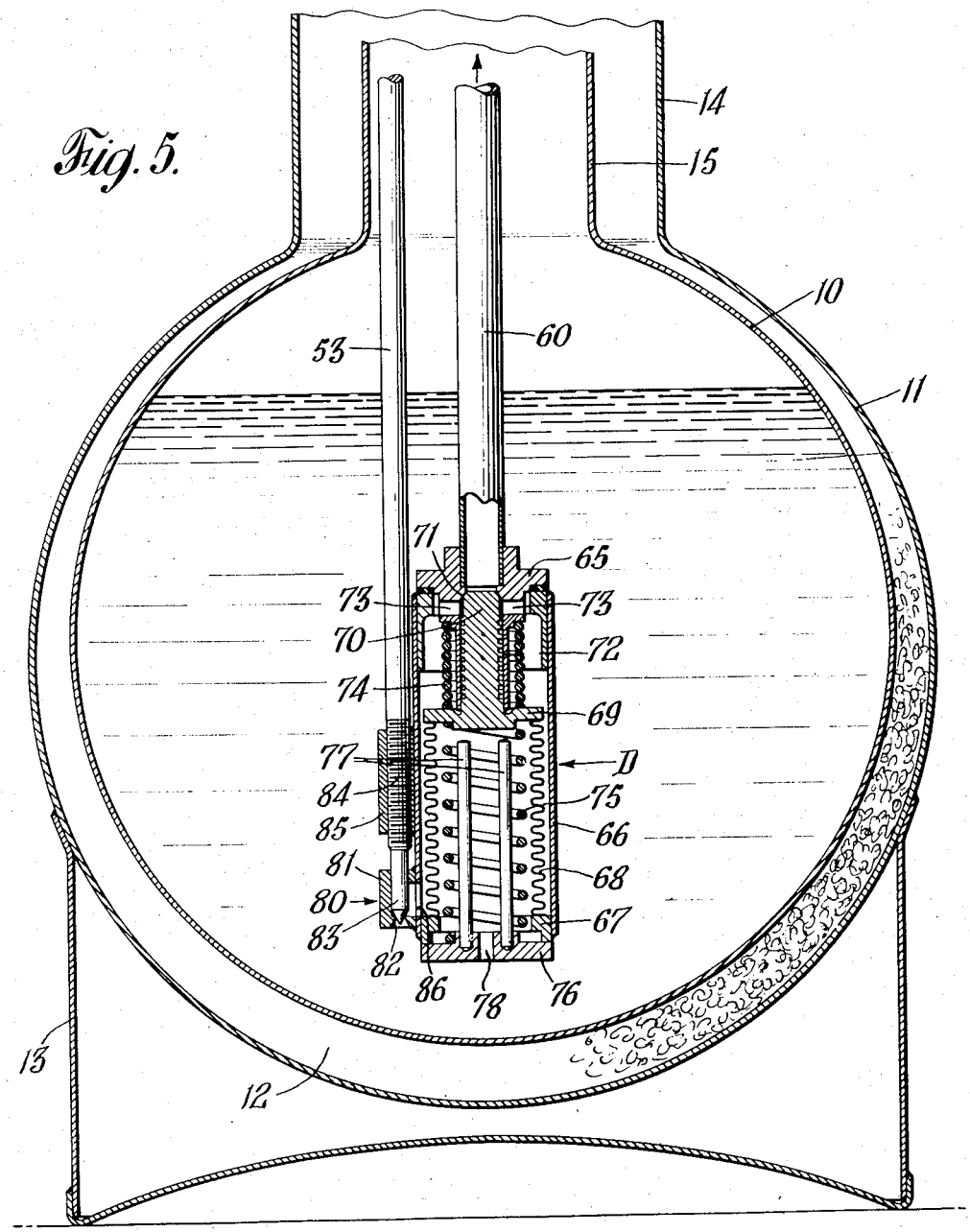

Patented Sept. 11, 1951

2,567,588

UNITED STATES PATENT OFFICE 2,567,588

METHOD OF AND APPARATUS FOR WITHDRAWING FLUID FROM CONTAINERS

George H. Zenner and Peter M. Riede, Kenmore, N. Y., assignors, by mesne assignments, to Union Carbide and Carbon Corporation, a corporation of New York Application August 22, 1946, Serial No. 692,336

11 Claims. (Cl. 62—1)

1

This invention relates to a method of and apparatus for withdrawing a fluid from a container and more particularly to withdrawing a liquefied gas from a container at a uniform rate from the beginning to the end of the withdrawal.

When a fluid, especially a cold fluid such as a liquefied gas, is withdrawn from a container, the rate of flow measured in terms of weight of fluid per unit of time usually changes due to changes caused by temperature and/or pressure variations. Thus, even though a means for volumetric flow control is used, such as a variable flow orifice, the density of the fluid varies due to temperature changes. The change of head pressure during withdrawal also changes the temperature of liquefied gas as well as the differential pressure across the flow orifice. Such changes occur especially when the flow is first started and a uniform weight rate of flow beginning instantly when flow is started is not obtained.

The objects of the invention, therefore, are to provide a method of and apparatus for the uniform weight rate withdrawal of a cold fluid from a container; particularly such a method and apparatus by which the weight rate of discharge is uniform from the start to the end of any desired period of discharge, and by which gas material may be discharged at a uniform weight rate from a container of liquefied gas having a low boiling point temperature.

Further objects of the invention are to provide a method of and apparatus for uniform weight rate of flow of a liquefied gas from a container by which the desired rate of flow can be selected between wide limits and with any such selected rate, the rate desired is attained immediately upon the start of flow and is maintained constant unless a different rate is selected; and to maintain a constant flow rate irrespective of changes of temperature of the liquefied gas and changes of pressure in the supply container.

These and other objects and novel features of the invention will become apparent from the following description having reference to the annexed drawings, in which:

Fig. 3 is a more or less diagrammatic view of a cross-section through another embodiment of apparatus for the uniform weight rate withdrawal of liquefied gas according to the invention;

2

Fig. 4 is a view of a cross-section on an enlarged scale of a variable orifice controlling device employed in the container of Fig. 3; and Fig. 5 is a fragmentary sectional view of an apparatus similar to that of Fig. 3 on an enlarged scale containing a different embodiment of flow controlling device according to the invention.

The apparatus according to the invention provides for a uniform discharge rate of cold liquid such as a liquefied gas, particularly liquid oxygen or nitrogen, from a container of such liquid immediately at the start of discharge by maintaining a flow metering element or orifice at the same temperature as the liquid; preferably by arranging the orifice so that it is immersed in the liquid. The desired rate of discharge begins immediately because there is no change of density of the liquid that first passes through the metering element. The apparatus also provides for adjustment or selection of the flow rate desired within a substantial range, for example between 0 to 5 or more pounds per minute, and with any rate so selected the discharge rate is maintained constant during the entire delivery period. According to the invention these provisions are obtained in either of two ways, in the first of which the orifice area is fixed and differential regulating means is provided for varying the differential pressure across the fixed orifice both for setting the desired rate and for automatically maintaining constant the selected differential pressure irrespective of pressure changes in the liquid container. This requires a differential pressure regulator which is sufficiently sensitive over the range of differential pressures required to obtain constant flow at any rate within the desired range. The range obtainable with any one orifice is somewhat limited and for a different range another size of orifice may be substituted.

A second way according to the invention employs a variable metering element or orifice the area of which is varied while the pressure difference across the orifice is held constant. To select the desired discharge rate, the orifice area is adjusted and the differential pressure across the orifice is maintained constant. The means for maintaining constant differential pressure is preferably mounted in the container adjacent the variable orifice.

Figure 1:
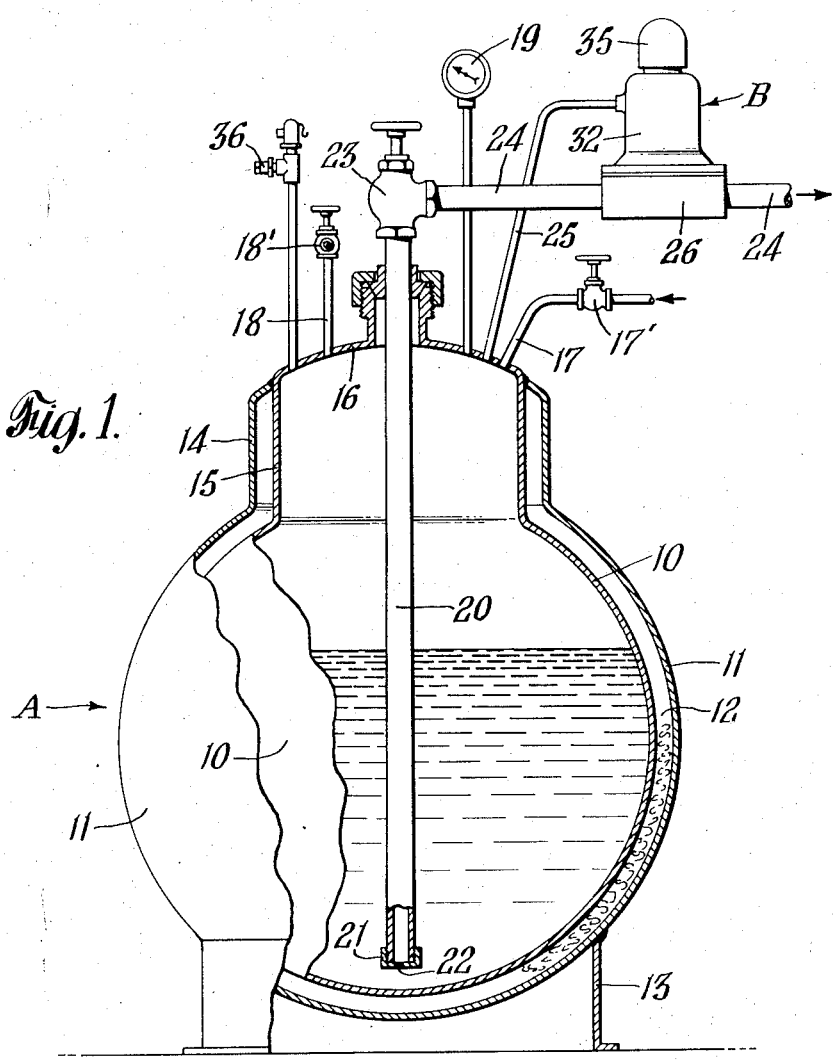
Fig. 1 illustrates more or less diagrammatically a container for holding liquefied gas with apparatus for uniform weight rate withdrawal therefrom according to the invention.

Referring now to the drawings and particularly to Fig. 1, the container indicated generally at A, for holding a supply of liquefied gas, includes an inner vessel 10, surrounded by an outer casing 11, which is spaced from the inner vessel to provide an insulating space 12, which may be highly evacuated. The casing 11 is provided with a support 13 and has at its upper end a neck portion 14 that surrounds a neck 15 of the inner vessel, the necks 14 and 15 being secured gas-tightly to a head 16 at their upper ends.

The vessel may be provided with various auxiliary devices connected through the head 16, such as a filling connection 17, a blow-off connection 18 and a pressure gauge 19, the connections 17 and 18 being controlled by suitable valves 17' and 18'. A safety relief device 36 may also be provided. For withdrawing liquefied gas from the container, an eduction tube 20 is provided extending through the head 16 and the neck 15 to a point near the bottom of the inner vessel 10. A metering element in the form of a cap 21 having an orifice 22 therethrough is removably mounted at the lower end of the tube 20, the area of orifice 22 being fixed and predetermined to provide the desired range of discharge rates.

The metering element is thus mounted in heat-conducting relation with the liquefied gas so that it is always at the same temperature as the liquefied gas, which temperature will be the boiling point temperature of the liquefied gas corresponding to the pressure under which it is held in the vessel 10. The upper end of the tube 20 is controlled by a withdrawal valve 23, the discharge outlet of which communicates with a withdrawal line 24, which conducts the discharged gas material to receiving or consuming apparatus (not shown). Interposed in the withdrawal line 24 is a differential pressure regulator indicated generally at B. The differential pressure regulator B is constructed to maintain a constant pressure difference between the pressure in the vessel 10, which is communicated through a connection 25 from the head 16 to the regulator B, and the pressure in the tube 20, which pressure is communicated through the withdrawal line 24 up-stream of the differential regulator.

Figure 2:
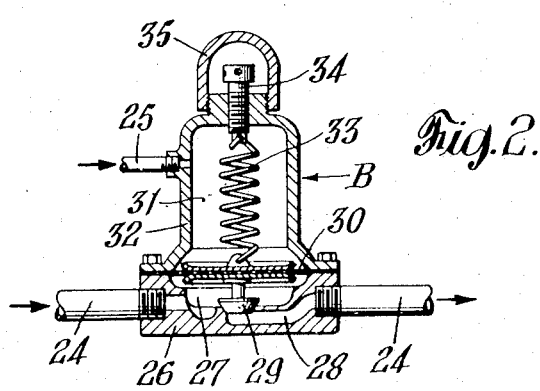
Fig. 2 is a cross-sectional view of the differential pressure regulator employed in Fig. 1.

The differential regulator may be variously constructed, but is preferably constructed substantially as illustrated in Fig. 2. The regulator shown in Fig. 2 comprises a valve body 26, having an inlet chamber 27 connected to the up-stream portion of the withdrawal line 24 and an outlet chamber 28 connected to the downstream side of the withdrawal line 24. Communication between the inlet 27 and the outlet 28 is controlled by a valve 29, which is regulated by a pressure responsive diaphragm 30. The diaphragm 30 seals the inlet chamber 27 from a pressure chamber 31, formed within the housing 32. The connection 25 is secured to the housing 32 so that the pressure in the chamber 31 is the same as that in the vessel 10. A tension spring 33 is preferably connected between the upper side of the diaphragm 30 and the end of an adjusting screw 34, threaded through the top of the housing 32. The screw 34 is preferably covered by a gas-tight cap 35.

In operation a charge of liquefied gas is placed in the vessel 10 and the vessel is kept closed until the pressure therein rises to a desired value higher than the desired discharge pressure. A cap 21, having an orifice 22 of the predetermined proper diameter is previously provided at the lower end of the tube 20. The tension of spring 33 is adjusted by the screw 34 to provide a desired differential of pressure between the pressure in the vessel 10 and the tube 20 during flow. When the withdrawal valve 23 is opened wide, flow through the orifice 22 and out the withdrawal line 24 will occur immediately at the desired constant weight rate because the differential regulator will maintain a constant pressure difference across the orifice 22, which orifice is maintained at a constant temperature. Therefore, the dimensions of the orifice 22 will not change after flow begins nor will the density of the liquefied gas passing through the orifice 22 change appreciably after flow begins, and the weight rate of discharge of liquefied gas from the container A is thus maintained constant from the instant of opening the withdrawal valve 23 to the instant of closing this valve. The pressure of the gas material discharged from the withdrawal line is lower by a definite amount than the pressure in the vessel 10, and, even though a change in pressure may occur in the vessel 10, for example due to an increase of the gas space above the liquid as discharge occurs, the differential pressure across the orifice 22 will remain constant within limits.

In the apparatus of Figs. 1 and 2 the range of discharge rates is selectable by changing the orifice 22, and within a selected range the discharge rate is selectable by adjustment of the screw 34. Operation of a specific apparatus according to the features of Figs. 1 and 2 resulted in the following data for a liquefied gas:

Weight of liquid in container at start; 18 pounds.

State of liquid; saturated at 25 p. s. i. pressure, temperature corresponding.

Discharge pressure; 5 p. s. i.

Discharge rate; constant at 6.3 lb./min. for an entire withdrawal of 16 pounds.

Pressure in container at end of such discharge; 13 p. s. i.

Temperature of liquid reduced to that corresponding to 13 p. s. i.

In the embodiment of Fig. 3, parts corresponding to those of Fig. 1 are designated by similar reference characters; thus the container A—I comprises an inner vessel 10, outer casing 11, insulation space 12, support 13 and necks 14 and 15. A head closure 116 is provided with filling connection 17, blow-off 18, gauge 19 and safety relief 36. Within the lower part of the vessel 10 is disposed a variable orifice device indicated generally at C, the internal construction of which may preferably be as shown in Fig. 4.

The flow controlling device C includes a tubular shell or frame 40 at the bottom of which is secured a bottom head 41 having a centrally located orifice 42 therethrough. At the upper edge of the orifice 42 is an annular seating surface 43 cooperating with a valve element 44 that is guided for vertical movement by a sleeve-like extension 45 of the bottom head 41. The upper end of the valve element 44 is secured to a closure plate 46 of a pressure responsive means in the form of a metal bellows 47. The upper end of the bellows is secured to an annular end piece 48 which is tightly secured to the upper end of the shell 40 so as to form a chamber 49 between the bellows, the shell and the bottom head 41. A spring 50 surrounding the sleeve 45 may be retained between the bottom head and the plate 46 and the force of the spring 50 is counteracted to a desired adjustable degree by a main spring 51 within the bellows 47 and retained between the plate 46 and a spring retainer 52. Means for adjusting the spring 51 is provided by a rod 53 that is threaded through a cap 54 secured on the annular piece 48 and which engages the spring retainer 52. The rod 53 extends upwardly through a packing box 55 in the head 116 of the container and carries at its upper end a handle 56 so that the spring tension can be adjusted as required.

The interior of the bellows 47 is in pressure communication with the interior of the vessel 10 through apertures 57 through the upper part of the annular piece 48 and entrance of liquid into the chamber 49 is obtained solely through an orifice 58 of predetermined size drilled through the bottom head 41. Liquid passes from chamber 49 to the interior of sleeve 45 above the valve seat 43 through passage 59 and, after passing valve 44, liquid flows through a discharge conduit 60 connected at the outlet of orifice 42 and passing through a seal 61 in the head 116. A stop valve 62 controls the outer end of conduit 60 and has its discharge connected to a line 63 leading to consuming apparatus.

The apparatus of Fig. 3 operates similarly to that of Figs. 1 and 2, and is prepared for operation by providing therein a charge of liquefied gas unded desired moderate operating pressure which may vary within wide limits. The handwheel 56 is turned to increase the force of spring 51 an amount as determined by previous tests in order to obtain the desired discharge flow rate. The maximum back pressure in the line 63 must be lower than the lowest variable pressure in the container 10 by an amount at least equal to the pressure drop through the orifice 58, valve 44, line 60, and valve 62 when the valve 44 is wide open. When discharge is to begin, valve 62 is opened fully and flow will begin at the desired rate initially and such rate will be maintained until valve 62 is closed or practically all the liquid is discharged. This rate is maintained constant by the device C irrespective of the drop in pressure in the vessel 10, the reduction of temperature due to the drop in pressure, the lowering of the liquid head in the container, and the change of liquid head in the conduit 60. The flow through the device C is controlled by the orifices 58 and 42 in series, the latter being automatically varied. Such flow causes the pressure in chamber 49 to be lower than that in the container 10 by a predetermined differential selected by the setting of the handle 56. If pressure in chamber 49 should tend to increase, the bellows will tend to compress spring 51, and thus lift the valve 44 further away from seat 43. The increased orifice area at 43 tends to reduce the pressure in chamber 49. Thus the differential pressure will be constant even though the external pressure at 58 and 57 may vary widely.

In the embodiment of Fig. 5 the flow controlling device indicated generally by D also provides a constant differential of pressure across a metering orifice but for selecting different rates of flow the metering orifice area is adjustable while the pressure differential remains the same. The liquefied gas container may be the same as that of Fig. 3 and therefore the upper part of the neck and the head are not shown.

The flow controlling device D is disposed within the lower part of the inner vessel 10 and is suspended from the lower end of the eduction tube 60 which is secured to a valve body 65. The valve body 65 is secured to and seals the upper end of a tubular housing 66, the lower end of which is sealed by a ring 67 to which the lower end of a pressure responsive bellows element 68 is soldered. The upper end of the bellows 68 is secured to an enlarged head 69 of a valve element 70 that extends upwardly from the head 69 and has an end portion that cooperates with a valve seat 71 forming the end of a passage through the valve body 65 into the tube 60. The valve body 65 also has a guide sleeve 72 for the valve, and passages 73 through the sleeve 72 are provided for flow of liquid to the valve seat from the interior of the housing 66. The valve 70 is normally urged away from the seat 71 by a helical spring 74 acting between a portion of the sleeve 72 and the head 69. Although not essential, the spring 74 employed may provide slightly greater force than the net resultant force needed and the extra force is counteracted by a weaker coil spring 75 within the bellows 68 acting between the head 69 and a lower end closure 76. Guide rods 77 for the spring 75 have a length such that they act as stops to limit the movement of the valve 70. The closure 76 has an opening 78 therethrough to provide free communication between the inside of the bellows and the vessel 10 so that the valve 70 is controlled to maintain a constant difference of pressure between the vessel 10 and the inside of the housing 66.

Liquid enters the housing 66 through an adjustable orifice indicated generally at 80 and which comprises a body 81 secured to the side of the housing 66 near its lower end and having a valve seat passage 82 in its bottom. The passage 82 is controlled by a needle valve 83 at the lower end of the rod 53. The needle valve 83 passes slidingly through the upper end of the body 81 and the rod 53 is provided with threads 84 engaging threads in a block 85 secured to the side of the housing 66 above the body 81. The interior of the body 81 communicates through a passage 86 in the housing 66 with the inside of the housing.

In operation the discharge rate can be selected within a relatively wide range by adjusting the area of the metering orifice 80 by turning the handle 56 at the upper end of the rod 53 an amount predetermined by tests. When discharge valve 62 is opened, flow will begin immediately at the desired rate because the bellows controlled valve will throttle the flow enough to maintain a constant differential of pressure across the orifice 80. The ability to adjust the size of metering orifice provides a substantially wider range of flow rates which can be maintained constant.

With an apparatus according to the principles of Fig. 5, for example, discharge rates between 0.5 to 5 pounds per minute were selectable, and for any selected discharge rate the flow was constant with negligible variation throughout the entire discharge period.

It will be seen that in each of the embodiments the orifice is maintained at liquid temperature so that when flow starts there is no gas phase to be passed through the orifice before liquid flows therethrough and a constant density of material passes the orifice so that discharge at the desired rate begins immediately. In each the discharge rate is maintained constant and this is accomplished; in Figs. 1, 3, and 5 by an orifice that may be maintained at constant area and an automatically maintained differential pressure across the orifice; and in Fig. 6 by a fixed area orifice and a constant head pressure providing a substantially constant differential pressure across the orifice. In Figs. 1 and 3 the discharge rate that is to be maintained constant is selectable by adjusting the differential pressure; in Fig. 5 the discharge rate is selectable over a wider range by adjustment of the orifice area while the differential pressure remains constant.

What is claimed is:

1. A method of delivering a low temperature liquefied gas from a confined zone wherein it is held in liquid and gas phases under pressure and at low temperature, which method comprises passing the liquid to be withdrawn first through a metering orifice element maintained throughout its complete extent at the temperature of the liquid in said confined zone irrespective of liquid level variations therein; further reducing the pressure of the withdrawn liquid to a desired delivery pressure value, and during the entire withdrawal period maintaining the pressure on the downstream side of said orifice at an intermediate pressure which is lower by a constant differential than the pressure in said container, said intermediate pressure being higher than said delivery pressure for maintaining a constant weight rate flow of liquefied gas during the entire withdrawal period.

2. Method of delivering a cold fluid from a confined zone wherein it is held under pressure, which method comprises passing the fluid successively through metering elements maintained at the temperature of said fluid; and during the entire withdrawal period varying the passage through a subsequent one of said metering elements in response to the differential pressures between the upstream and downstream sides of said metering elements to maintain a substantially constant weight rate delivery of said fluid during the entire withdrawal period.

3. A method of delivering a low temperature liquefied gas from a confined zone wherein it is held in liquid and gas phases under pressure and at low temperature, which method comprises passing the liquid successively at lower pressures through metering elements, the first of which is maintained completely at the temperature of said liquid phase irrespective of variations of liquid level in said confined zone; and during the entire withdrawal period varying the passage through a subsequent one of said metering elements in response to the differential pressure between the upstream and downstream sides of said first metering element to maintain a substantially constant pressure drop across said first metering element and a constant weight rate delivery during the entire withdrawal period.

4. Apparatus for the uniform weight rate withdrawal of a cold fluid from a container wherein the fluid is held under pressure, which apparatus comprises an orifice element communicating at its upstream side with the fluid in the container; means whereby said orifice element throughout its extent is maintained at the temperature of said fluid; a discharge conduit from the downstream side of said orifice for fluid to be discharged, said conduit having a cross-sectional area larger than that of said orifice element; and a pressure responsive means controlling said conduit and having pressure communication with said container for maintaining a constant differential of pressure across said orifice.

5. Apparatus for the uniform weight rate withdrawal of gas material from a container of liquefied gas, which comprises an orifice element disposed within the liquefied gas in said container; a passage conducting gas material from the discharge side of said orifice to a point externally of said container, said passage having a cross-section larger than that of said orifice element; valve means controlling said passage; pressure responsive means for regulating said valve, said pressure responsive means being in pressure communication with the fluid in said container and the gas material in said passage to maintain a constant differential of pressure across the orifice during withdrawal; and a stop valve in said passage for starting and stopping the withdrawal.

6. Apparatus for the uniform weight rate withdrawal of a cold fluid from a container wherein the fluid is held under pressure, which apparatus comprises an adjustable orifice element communicating at its upstream side with the fluid in the container; means whereby said orifice element is maintained at the temperature of said fluid; a discharge conduit from the downstream side of said orifice for fluid to be discharged; means for adjusting the area of said orifice element to select a desired discharge rate; and a pressure responsive means controlling said conduit and having pressure communication with said container for maintaining a constant differential of pressure across said orifice.

7. Apparatus for delivering a cold fluid from a container wherein it is held under pressure, which apparatus comprises first and second metering elements in series, both disposed in heat exchange relation to said fluid in the container and having the upstream side of the first in communication therewith, the second metering element having a variable passage portion communicating with a discharge conduit having a larger cross-sectional area than said first metering element; and means for cooperatively regulating said variable passage portion in response to the pressures in the container and on the downstream side of said first metering element for regulating the differential pressure across the first metering element to maintain a substantially constant weight rate delivery of said fluid during an entire withdrawal period.

8. Apparatus for delivering a cold fluid from a container in which it is held under pressure and low temperature, which apparatus comprises a metering device within said container having a shell forming a chamber, a pressure responsive element forming one wall of said chamber and exposed to the pressure in said container, a metering orifice associated with a wall of said chamber for passage of liquid into said chamber; a discharge passage from said chamber to a discharge conduit; valve means in control of said discharge passage and operable by said pressure responsive element; resilient means normally biasing said valve means toward open position; and means operable from externally of said container for adjusting the degree of said biasing to select a desired weight rate of discharge, said metering device being constructed to maintain the selected rate of discharge constant during an entire period of discharge.

9. Apparatus for delivering a cold fluid from a container in which it is held under pressure and low temperature, which apparatus comprises a metering device within said container having a shell forming a chamber, a pressure responsive element forming one wall of said chamber and exposed to the pressure in said container; an adjustable metering orifice associated with a wall of said chamber for passage of liquid into said chamber; a discharge passage from said chamber to a discharge conduit; valve means in control of said discharge passage and operable by said pressure responsive element; resilient means normally biasing said valve means toward open position with a force for maintaining a constant differential of pressure across said orifice during flow therethrough; and means for adjusting the area of said metering orifice to select a desired weight rate of flow therethrough.

10. An apparatus for delivering a cold fluid from a container according to claim 9 including a stop valve in said discharge conduit at a point externally of said container and in which said orifice adjusting means is provided with an operating member extending through a seal to a point externally of said container.

11. A method of delivering a cold fluid from a confined zone wherein it is held under pressure, which method comprises maintaining an adjustable orifice element at the temperature of said fluid; adjusting the area of said orifice to provide a desired weight rate of flow therethrough; starting full flow through said orifice when delivery is to begin; and during the entire delivery period, maintaining a constant differential of pressure across said orifice irrespective of a change of pressure in the confined zone.

GEORGE H. ZENNER.
PETER M. RIEDE.

REFERENCES CITED

The following references are of record in the file of this patent:

UNITED STATES PATENTS

| Number | Name | Date |
|--------|------|------|
| 1,844,814 | Wolfe | Feb. 9, 1932 |
| 1,971,106 | Hasche | Aug. 21, 1934 |
| 2,072,713 | Folmsbee | Mar. 2, 1937 |
| 2,329,323 | Benz | Sept. 14, 1943 |
| 2,393,545 | Martin | Jan. 22, 1946 |